No. 616,302. Patented Dec. 20, 1898.
G. EVANS.
POST AND DISK ATTACHMENT FOR ARTIFICIAL TOOTH CROWNS.
(Application filed Oct. 29, 1895. Renewed May 25, 1898.)
(No Model.)
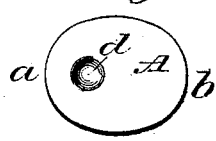
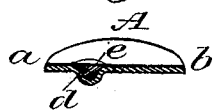
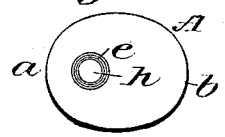
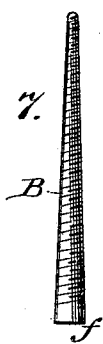
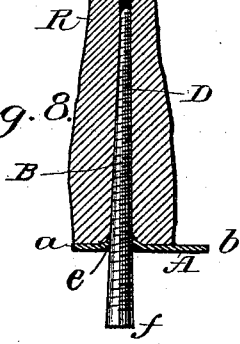
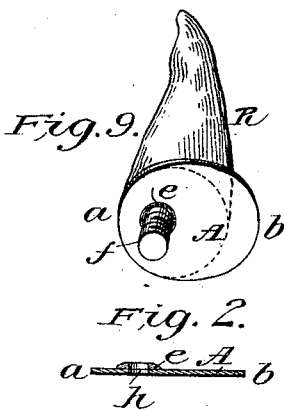
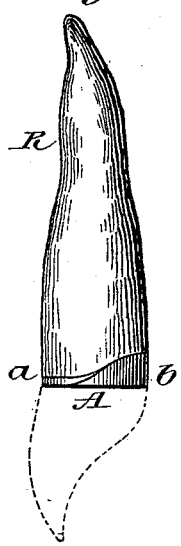
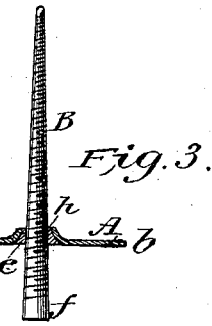
Witnesses.
Chas. E. Peters
Frederick M. Hutchinson
Inventor.
George Evans
By Wreton C. Dunn
Atty.
THE NORRIS PETERS CO., PHOTO-LITHO., WASHINGTON, D. C.

_ _

UNITED STATES PATENT OFFICE.

GEORGE EVANS, OF NEW YORK, N. Y.

POST AND DISK ATTACHMENT FOR ARTIFICIAL TOOTH-CROWNS.

SPECIFICATION forming part of Letters Patent No. 616,302, dated December 20, 1898.

Application filed October 29, 1895. Renewed May 25, 1898. Serial No. 681,739. (No model.)

*To all whom it may concern:*

Be it known that I, GEORGE EVANS, a citizen of the United States, residing at the city of New York, in the county of New York and State of New York, have invented certain new and useful Improvements in Post and Disk Attachments for Artificial Tooth - Crowns; and I do hereby declare the following to be a full, clear, and exact description of the invention, such as will enable others skilled in the art to which it appertains to make and use the same.

My invention relates to devices or means for capping the roots of natural teeth to prepare them for the reception of artificial porcelain crowns and which said devices or means shall also furnish an attachment or connection between the artificial crowns and the roots.

The object of my invention is to simplify the operation of mounting artificial crowns on the roots of natural teeth and to provide means or devices for forming the attachment of the crowns which can be supplied in forms and sizes adapted to the roots of the different teeth ready for application, thus obviating the necessity of making these devices for every operation.

To this end my invention comprises a screw-threaded post, pin, or metallic dowel of conical, cone-like, or tapered form which is designed to be driven into a socket or hole prepared for it in the root, and in connection therewith a metallic plate having a quantity of pure gold fused on its surface (or in a depression formed therein) at the point where the pin, post, or dowel is to be driven through the plate and into the socket in the root, so that by fusing the gold the pin, post, or dowel and plate are permanently and immovably fastened together and can then be immediately attached to the root without investing and soldering, as has been the practice heretofore.

In the accompanying drawings, Figure 1 represents a plan of the plate and the gold fused on its surface; Fig. 2, the same with a hole punched through the gold and plate. Fig. 3 represents the pin, post, or dowel inserted and the part of the plate around the post depressed. Fig. 4 represents a plate provided with a depression for the gold; Fig. 5, a section of the plate, taken through the depression and gold filling; Fig. 6, a plan of the plate with the hole for the pin drilled through and showing the gold surrounding the hole. Fig. 7 represents the pin, post, or dowel. Fig. 8 represents in section the root of a tooth, showing the pin in the hole or socket prepared for it in the root and the plate in position against the end of the root, thus illustrating the operation of fitting the pin to the root. Fig. 9 is a perspective view of the root, plate, and pin. Fig. 10 represents the root with the cap completed and ready for the attachment of the crown, which is shown in broken lines.

Referring to the drawings, A is the plate, which is made of thin metal, preferably platina, its shape being oval, ovoid, elliptical, or ellipsoidal, so that one end *a* corresponding to the labial side of the root can be conformed to the shape of the end of the root; but the plate will be larger in order that its end *b* corresponding to the palatal side of the root will project back of the root, for a purpose that will be described presently. Near the end *a* and in line with the longer axis of the plate a small quantity of pure gold *e* is fused on the surface of the plate, as shown in Fig. 1, or, if preferred, and as an alternative arrangement a conical, conoidal, or concave depression *d* may be stamped in the plate at the same point and the pure gold placed in the depression and fused therein, so as to fill the same flush with the top surface of the plate, as indicated in Figs. 4 and 5. The plate when thus formed and with the gold fused on its surface or in the depression is a complete article of manufacture and, in the form in which it is to be furnished to the profession, ready to be fitted to the root of a tooth.

B is the pin, dowel, or post, which connects the capping-plate A with the root and through said plate connects the crown with the root. This "pin," as it will hereinafter be called, is made of metal, preferably iridio-platinum. It is of conical form, tapered almost to a point, and is screw-threaded. This pin is intended to be passed through the capping-plate at the center of the gold *d* and up into the hole or socket in the root and, like the plate, is to be furnished ready made to the profession as an article of manufacture.

The manner of adapting the plate and pin to the root and the operation of applying them are as follows: The hole or socket D in a root R is reamed out in the usual manner by a reaming instrument of a certain size and number. In the hole a pin B, of size and number corresponding to the reamer, is fitted in the following manner: A hole $h$, smaller than the pin, is made through the gold and plate, whereby in the flat plate the metal around the hole on the side opposite the gold is forced outward, forming a conical projection on this side and countersinking the metal on the other side, so that the gold lies in a cup-like depression similar to that of the plate formed with the depression. The plate is applied to the end of the root with its conical projection in the orifice of the socket in the root, as shown in Fig. 8. The pin is next gradually screwed through the hole in the plate and upward into the hole in the root until its proper position through the plate and in the root is exactly determined. The edges of the hole in the plate catch the threads of the pin and the socket and gold lining form a guide which retains the pin in proper position and causes it to enter the root properly with respect to the plate. When the length of the pin is determined, it and the plate are removed together and then united or soldered together by holding them in the flame of a Bunsen burner until the gold in the depression fuses around the pin. Thus by this method the length of the pin required to fill the socket in the root and the relative positions of the pin and plate are first exactly determined by fitting them to the root and they are then instantly united without investing or the use of solder. The plate is next shaped and burnished to the end of the root, and the projecting end $f$ of the pin cut off flush with the plate, and the crown (porcelain or metal) mounted on the plate, and the pin and plate cemented to the root in the usual manner. The edge of the plate at the labial side of the root is flush with the rim of the root, but at the proximate and palatal sides it extends outside of the rim, and these projecting edges are turned up against the sides of the root, forming thereby a partial band which strengthens the crown considerably and protects the back of the root.

I claim—

1. As a new article of manufacture for use in artificial crownwork a capping-plate having a quantity of soldering material fusible at a lower temperature than the plate, fused on its surface, substantially as specified.

2. As a new article of manufacture for use in artificial crownwork a capping-plate having a depression and the said depression filled with soldering material fusible at a lower temperature than the plate, substantially as specified.

3. The combination with a plate having a perforated depression, the sides of which are encircled and lined with gold of a screw-threaded pin, post or dowel fastened in the plate by the fused gold in the depression substantially as specified.

In testimony that I claim the invention above set forth I affix my signature in presence of two witnesses.

GEORGE EVANS.

Witnesses:
WILTON C. DONN,
CHAS. E. PETERS.